No. 627,231. Patented June 20, 1899.
G. H. HINRICHS.
FLOWER POT.
(Application filed Feb. 17, 1899.)

(No Model.)

Witnesses.

Inventor.

UNITED STATES PATENT OFFICE.

GERHARD HEEREN HINRICHS, OF DAVENPORT, IOWA.

FLOWER-POT.

SPECIFICATION forming part of Letters Patent No. 627,231, dated June 20, 1899.

Application filed February 17, 1899. Serial No. 705,915. (No model.)

*To all whom it may concern:*

Be it known that I, GERHARD HEEREN HINRICHS, of the city of Davenport, county of Scott, and State of Iowa, have invented an Improvement in Flower-Pots; and I do hereby declare that the following is a full, clear, and exact description of the same, reference being had to the accompanying drawings, with reference-letters marked thereon.

My invention is a water-receptacle made of porous material to be used in connection with a pot for the growing of plants, so arranged as to be entirely separate from the pot itself, but loosely inserted therein in such a manner as to surround a part or the whole of the earth contained in the pot, the receptacle to receive the water to be fed to the plants, and to deliver the same gradually through its walls.

The object to be accomplished by this device is to protect the earth and the roots of plants in the pot from outside heat, and especially from the direct rays of the sun, and to supply the water needed by the growing plants gradually by letting it percolate through the walls of the reservoir instead of having it poured on the earth.

Figure 1:
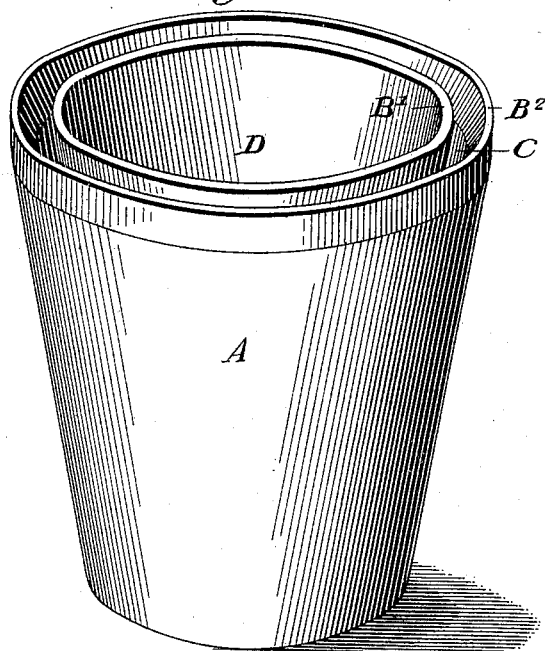
Figure 2:
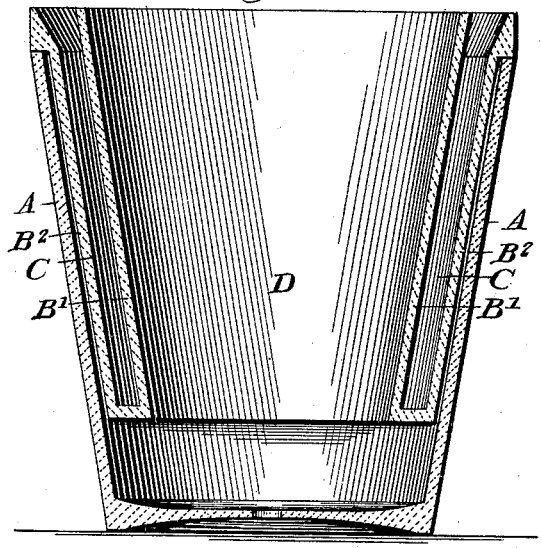

In the drawings, Figure 1 shows a view of my device and a common flower-pot. Fig. 2 shows a vertical section of the same.

In the figures, A denotes the common flower-pot. B' is the inner and B² the outer wall of the reservoir, C the space to be used for the water, and D the space to be used for the earth in which the plants are to grow. The reservoir B' B² is ring-shaped, conforming in its outer shape to the inner side of the pot and running down into the pot, while its projecting flange rests on the top of the pot.

I prefer to make this device of burnt clay and in the shape described; but the shape, relative size, thickness of wall, and extent of projection downward into the pot may be varied according to the requirements of different kinds of pots or plants, and while at present I am leaving the reservoir open on top, forming an open circular trough, the same may also be closed, except as to an opening to be left for the purpose of filling it with water.

I am aware that flower-pots have been constructed with a central earth-vessel separated from a concentric water-reservoir by a porous wall; but

What I claim as a new article of manufacture is—

A separate annular reservoir of porous material for use within a flower-pot, the reservoir at least partially surrounding the earth contained in the pot.

GERHARD HEEREN HINRICHS.

In presence of—
 GUS WOHLENBERG,
 BESSIE KELLY.